US010275917B2

(12) United States Patent
Suzuki

(10) Patent No.: US 10,275,917 B2
(45) Date of Patent: Apr. 30, 2019

(54) IMAGE PROCESSING APPARATUS, IMAGE PROCESSING METHOD, AND COMPUTER-READABLE RECORDING MEDIUM

(71) Applicant: OLYMPUS CORPORATION, Hachioji-shi, Tokyo (JP)

(72) Inventor: Tatsuhiko Suzuki, Kunitachi (JP)

(73) Assignee: OLYMPUS CORPORATION, Tokyo (JP)

(*) Notice: Subject to any disclaimer, the term of this patent is extended or adjusted under 35 U.S.C. 154(b) by 134 days.

(21) Appl. No.: 15/455,677

(22) Filed: Mar. 10, 2017

(65) Prior Publication Data

US 2017/0278288 A1 Sep. 28, 2017

(30) Foreign Application Priority Data

Mar. 25, 2016 (JP) ................................. 2016-062247

(51) Int. Cl.

| G06T 11/60 | (2006.01) |
| G06T 7/73 | (2017.01) |
| G11B 27/031 | (2006.01) |
| H04N 5/225 | (2006.01) |

(52) U.S. Cl.
CPC ................ *G06T 11/60* (2013.01); *G06T 7/73* (2017.01); *G06T 7/74* (2017.01); *G11B 27/031* (2013.01); *H04N 5/225* (2013.01); *G06T 2207/10016* (2013.01); *G06T 2207/30241* (2013.01); *G06T 2207/30244* (2013.01)

(58) Field of Classification Search
CPC ........... G06T 11/60; G06T 2207/10016; G06T 2207/30241; G06T 2207/30244; G06T 7/73; G06T 7/74; H04N 5/225
See application file for complete search history.

(56) References Cited

U.S. PATENT DOCUMENTS

| 8,831,281 B2* | 9/2014 | Shellshear | G06K 9/00751 382/103 |
| 2011/0142291 A1* | 6/2011 | Ahn | H04N 5/144 382/107 |
| 2011/0199461 A1* | 8/2011 | Horio | G06T 7/20 348/46 |
| 2012/0219174 A1* | 8/2012 | Wu | G06K 9/00711 382/103 |
| 2013/0051620 A1* | 2/2013 | Endo | G11B 27/00 382/103 |
| 2015/0348243 A1* | 12/2015 | Sutou | G02C 11/10 348/207.1 |

FOREIGN PATENT DOCUMENTS

JP 2011-095112 A 5/2011

* cited by examiner

*Primary Examiner* — Michelle L Sams
(74) *Attorney, Agent, or Firm* — Volpe and Koenig, P.C.

(57) ABSTRACT

An image processing apparatus includes: a change determination unit configured to determine, using data of a plurality of images captured continuously, whether a change in direction of capturing the plurality of images occurs; a change amount calculation unit configured to calculate a change amount of a position of an object shown in the plurality of images, depending on whether the change in direction of capturing the plurality of images occurs; and an auxiliary image creation unit configured to create data of an auxiliary image for displaying information on the object, the information being related to the change amount.

8 Claims, 8 Drawing Sheets

IMAGE PROCESSING APPARATUS, IMAGE PROCESSING METHOD, AND COMPUTER-READABLE RECORDING MEDIUM

CROSS REFERENCES TO RELATED APPLICATIONS

This application is based upon and claims the benefit of priority from Japanese Patent Application No. 2016-062247, filed on Mar. 25, 2016, the entire contents of which are incorporated herein by reference.

BACKGROUND

1. Technical Field

The disclosure relates to an image processing apparatus, an image processing method, and a computer-readable recording medium.

2. Related Art

There is a known technique for measuring a three-dimensional position of an object. For example, JP 2011-95112 A discloses a technique for calculating a three-dimensional position of a flying object on an imaging screen. With this technique, the height and the horizontal distance from the screen center position are calculated based on the distance from the measurement position origin to the flying object, relative height elevation angle, and relative orientation, and coordinates of the three-dimensional position of the flying object are calculated using the result of calculation.

SUMMARY

In some embodiments, an image processing apparatus includes: a change determination unit configured to determine, using data of a plurality of images captured continuously, whether a change in direction of capturing the plurality of images occurs; a change amount calculation unit configured to calculate a change amount of a position of an object shown in the plurality of images, depending on whether the change in direction of capturing the plurality of images occurs; and an auxiliary image creation unit configured to create data of an auxiliary image for displaying information on the object, the information being related to the change amount.

In some embodiments, an image processing method includes: determining, using data of a plurality of images captured continuously, whether a change in direction of capturing the plurality of images occurs; calculating a change amount of a position of an object shown in the plurality of images, depending on whether the change in direction of capturing the plurality of images occurs; and creating data of an auxiliary image for displaying information on the object, the information being related to the change amount.

In some embodiments, provided is a non-transitory computer-readable recording medium with an executable image processing program stored thereon. The program causes a computer to execute: determining, using data of a plurality of images captured continuously, whether a change in direction of capturing the plurality of images occurs; calculating a change amount of a position of an object shown in the plurality of images, depending on whether the change in direction of capturing the plurality of images occurs; and creating data of an auxiliary image for displaying information on the object, the information being related to the change amount.

The above and other features, advantages and technical and industrial significance of this invention will be better understood by reading the following detailed description of presently preferred embodiments of the invention, when considered in connection with the accompanying drawings.

DETAILED DESCRIPTION

Hereinafter, embodiments of the present invention (hereinafter, referred to as embodiment(s)) will be described with reference to the attached drawings. The drawings that are referred to in the following descriptions are schematically illustrated. When the same object is illustrated between different drawings, its dimension, scale, or the like, may be different in some cases.

Figure 1:
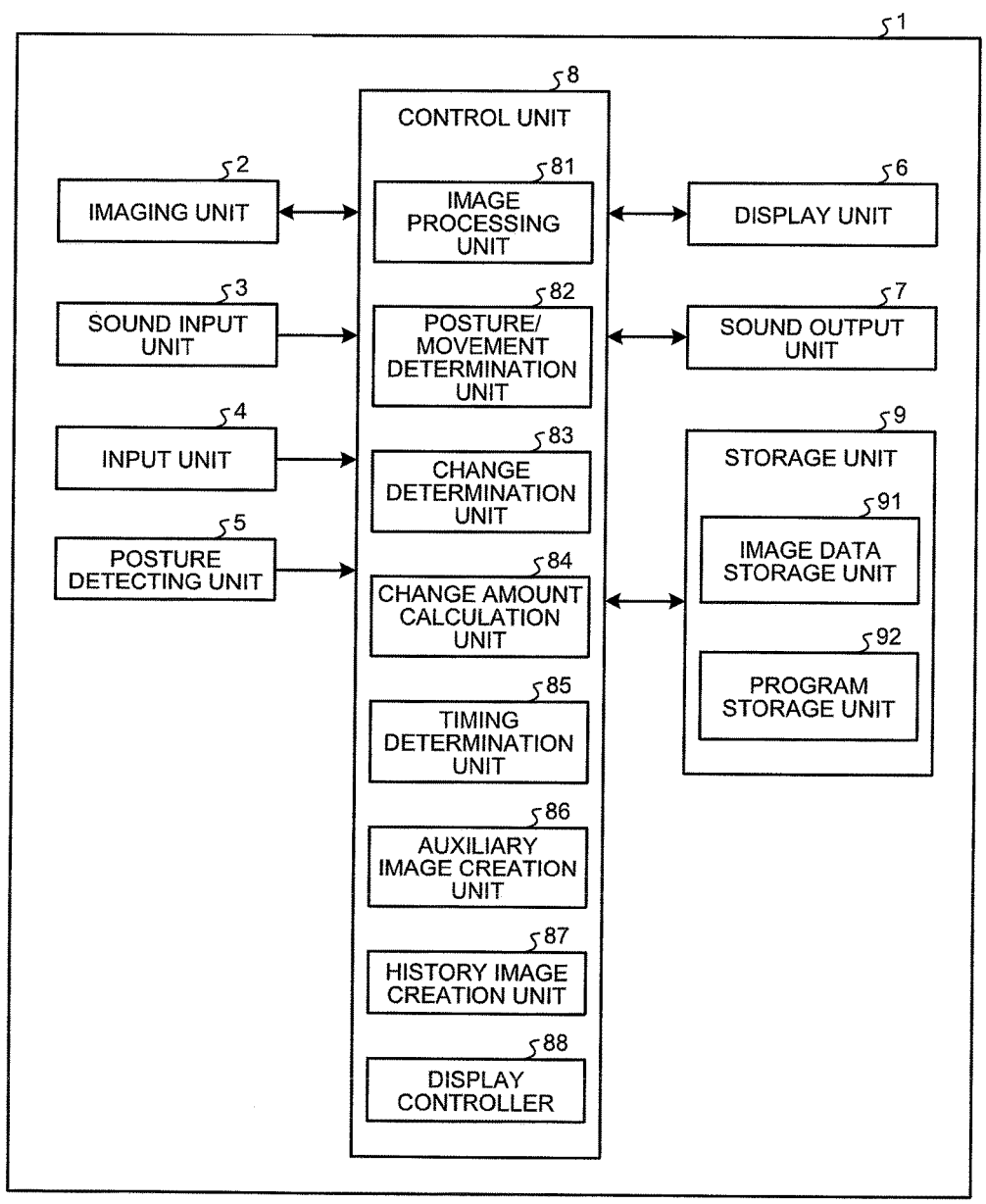
FIG. 1 is a block diagram illustrating a functional configuration of an imaging apparatus according to an embodiment of the present invention.

FIG. 1 is a block diagram illustrating a functional configuration of an imaging apparatus including an image processing apparatus according to an embodiment of the present invention. An imaging apparatus 1 illustrated in the diagram includes an imaging unit 2, a sound input unit 3, an input unit 4, a posture detecting unit 5, a display unit 6, a sound output unit 7, a control unit 8, and a storage unit 9. The imaging unit 2 generates image data by imaging an object based on an imaging parameter. The sound input unit 3 includes a microphone for collecting external sound and generating sound data. The input unit 4 receives input of various operation command signals. The posture detecting unit 5 detects posture of the imaging apparatus 1. The display unit 6 displays various types of information including the image captured by the imaging unit 2. The sound output unit 7 includes a speaker that outputs sound. The control unit 8 integrally controls operation of the imaging apparatus 1. The storage unit 9 stores information related to operation, or the like, of the imaging apparatus 1.

The imaging unit 2 has one or more lenses and includes an optical system and an imaging element. The optical system converges light from the object. The imaging element generates an electrical imaging signal by performing photoelectric conversion on the light focused via the optical system. The optical system has one or more various optical elements. The imaging element has an image sensor such as complementary metal oxide semiconductor (CMOS) or a charge coupled device (CCD).

The input unit 4 is provided on a touch panel laminated on a screen display area of the display unit 6 or on a main-body surface of the imaging apparatus 1. The input unit 4 has a user interface such as various switches and buttons including a release switch that receives input indicating still image capture and a moving image switch that receives input indicating start or end of moving image capture. The input unit 4 may include a microphone for sound input.

The posture detecting unit 5 includes a three-axis accelerometer, for example. The posture detecting unit 5 detects posture of the imaging apparatus 1 by detecting acceleration in the three-axis directions of the imaging apparatus 1.

The display unit 6 includes a display panel having liquid crystal, organic electro luminescence (EL), or the like. The display unit 6 can perform a rec-view display, a playback display, a live-view display, or the like. The rec-view display indicates displaying image data corresponding to a release signal for which input has been received by the input unit 4, for a predetermined time (for example, three seconds). The playback display indicates playback of the image data stored in the storage unit 9. The live-view display indicates sequentially displaying, in time series, live view images corresponding to the image data continuously generated by the imaging unit 2. The display unit 6 can display operation information and information related to imaging operation, of the imaging apparatus 1.

The control unit 8 has a function of image processing apparatus according to the embodiment. The control unit 8 includes an image processing unit 81, a posture/movement determination unit 82, a change determination unit 83, a change amount calculation unit 84, a timing determination unit 85, an auxiliary image creation unit 86, a history image creation unit 87, and a display controller 88.

The image processing unit 81 performs various types of image processing on image data (RAW data) generated by the imaging unit 2 and generates processed image data. Image processing performed by the image processing unit 81 includes at least a portion of optical black subtraction processing, white balance (WB) adjustment processing, synchronization processing (in a case where the imaging element of the imaging unit 2 has a color filter with Bayer array), color matrix calculation processing, gamma correction processing, color reproduction processing, and edge enhancement processing. The image processing unit 81 compresses the image data that have undergone the above-described various types of processing, in accordance with a predetermined still image format or a moving image format, and outputs the compressed data. Exemplary still image formats include JPEG and Exif. Exemplary moving image formats include MPEG-4, AVC/H.264, and AVCHD.

The posture/movement determination unit 82 determines posture of the imaging apparatus 1 using results of detection by the posture detecting unit 5, and determines movement of the object using image data generated by the imaging unit 2. In a case where movement is determined, the movement of the object is determined using a motion vector indicating movement of a representative point of the object between two images, created by the image processing unit 81.

The change determination unit 83 determines whether the image capturing direction of the imaging unit 2 has changed based on results of determination by the posture/movement determination unit 82, and determines whether the position of the object within the screen has changed. The change determination unit 83 determines whether the change in image capturing direction of the imaging unit 2 occurs by determining, for example, movement of the background with comparison of predetermined two frames (e.g. two adjacent frames). If the imaging apparatus 1 has a vibration sensor to detect camera shake, the change determination unit 83 may determine whether the change in image capturing direction of the imaging unit 2 occurs, based on the results of detection by the vibration sensor.

Figure 2:
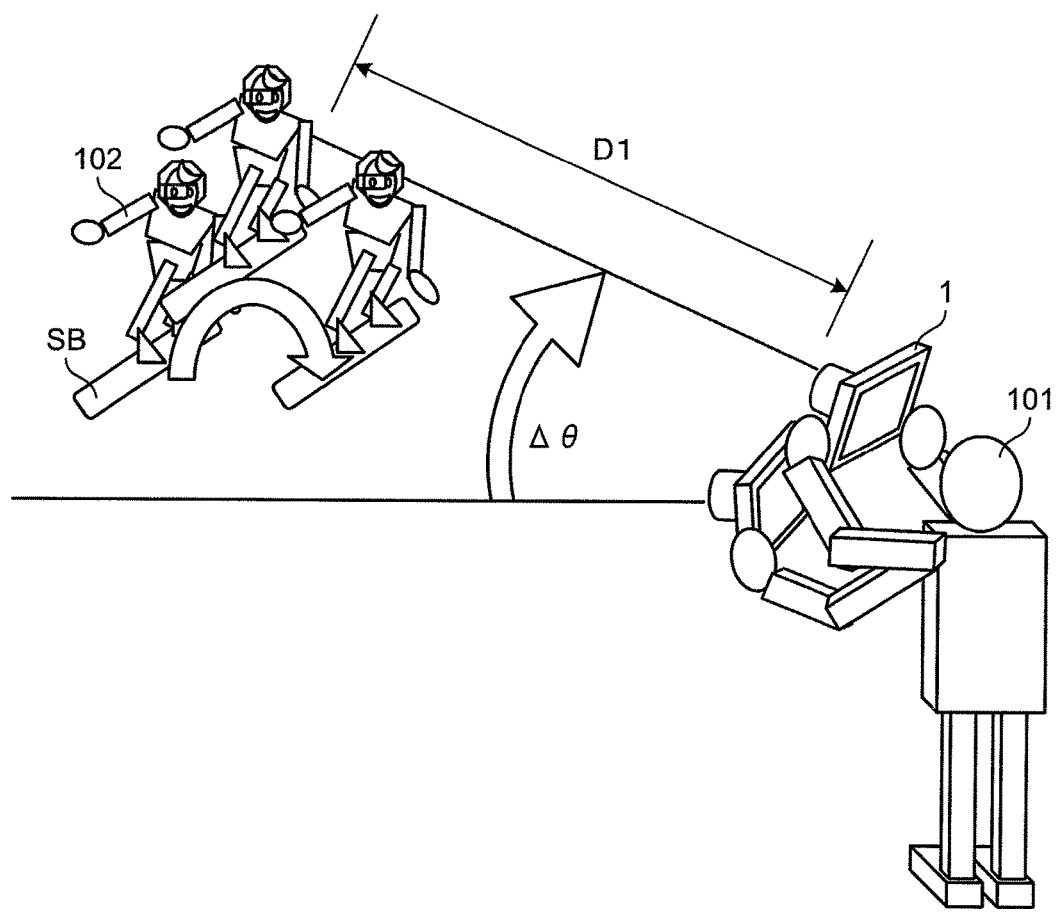
FIG. 2 is a diagram schematically illustrating a situation in which a change determination unit determines that there is a change in an image capturing direction.

FIG. 2 is a diagram schematically illustrating a situation in which the change determination unit 83 determines that there is a change in the image capturing direction. FIG. 2 schematically illustrates a situation in which a user 101 of the imaging apparatus 1 sets a snowboarder 102 riding on a snowboard SB as an imaging target and is capturing a moving image of a situation in which the snowboarder 102 is jumping during sliding. In the situation illustrated in FIG. 2, processing needs to be changed corresponding to whether the user 101 has changed the image capturing direction, in other words, whether the user 101 is operating the imaging apparatus 1 following the movement of the snowboarder 102. Hereinafter, this point will be described with specific examples.

Figure 3:
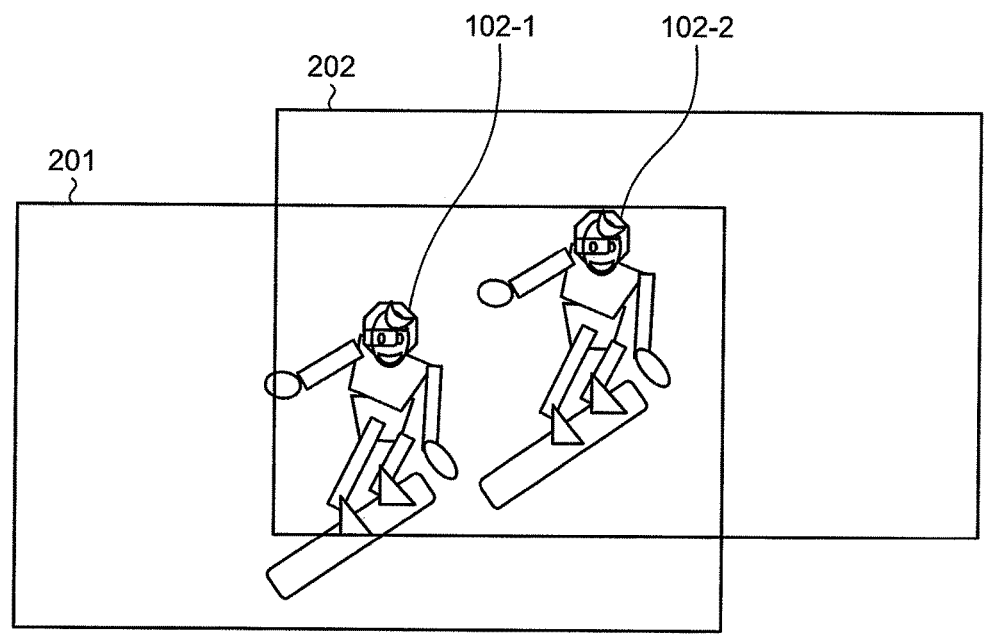
FIG. 3 is a diagram schematically illustrating images of two different frames in a case where a user is operating an imaging apparatus following the movement of an object.

FIG. 3 is a diagram schematically illustrating images of two different frames in a case where a user is operating the imaging apparatus 1 following the movement of the object. In FIG. 3, both the position of a snowboarder 102-1 in an image 201 and the position of a snowboarder 102-2 in an image 202 to be captured thereafter are substantially the central portion of the screen. Accordingly, in the case illustrated in FIG. 3, the positions of the snowboarder 102 are nearly unchanged between the two frames.

Figure 4:
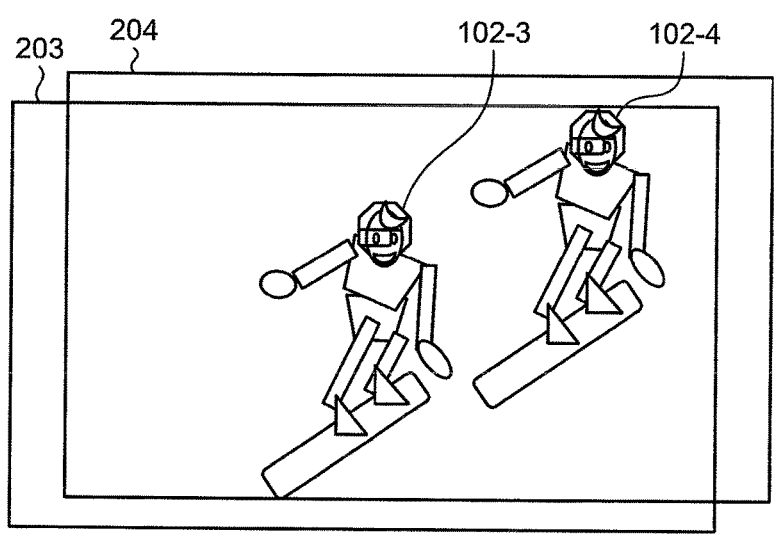
FIG. 4 is a diagram schematically illustrating images of two different frames in a case where the user is operating the imaging apparatus without being able to follow the movement of the object.

In contrast, FIG. 4 is a diagram schematically illustrating images of two different frames in a case where the user is operating the imaging apparatus 1 without being able to follow the movement of the object. In FIG. 4, while the position of a snowboarder 102-3 in an image 203 is substantially the central portion of the screen, the position of a snowboarder 102-4 in an image 204 is an upper-right portion of the screen. Therefore, in the case illustrated in FIG. 4, the position of the snowboarder 102 largely changes between the frames.

The change determination unit 83 determines that the image capturing direction has changed in the situation illustrated in FIG. 3, and determines that the image capturing direction has not changed in the situation illustrated in FIG. 4.

The change amount calculation unit 84 calculates the change amount of the position of the object. For example, as illustrated in FIG. 3, in a case where the user is operating the imaging apparatus 1 following the movement of the object, the change amount calculation unit 84 calculates a change amount $\Delta Y$ in the vertical direction, using a change $\Delta \theta$ of an angle (elevation angle) in the optical direction of the imaging unit 2 with respect to the horizontal direction, as follows:

$$\Delta Y = D1 \cdot \sin \Delta \theta \quad (1)$$

Hereinafter, the change amount $\Delta Y$ will be referred to as a first change amount. Herein, D1 in the right side represents a distance from the imaging apparatus 1 to the object. This amount is obtained based on a result of focusing, or the like, and Δθ is obtained from a result of detection by the posture detecting unit 5.

Figure 5:
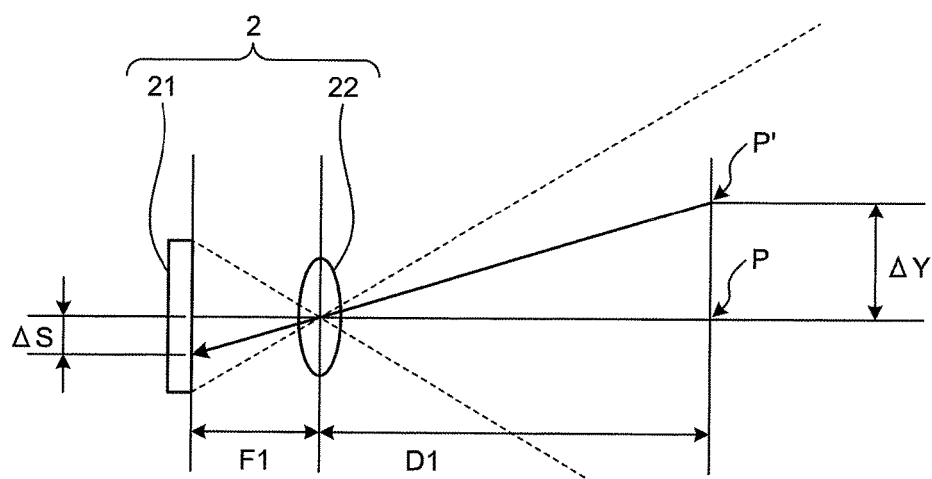
FIG. 5 is a diagram schematically illustrating a change amount in a case where the image capturing direction of the imaging apparatus does not change and the user is not able to operate the imaging apparatus following the movement of the object.

FIG. 5 is a diagram schematically illustrating a change amount in a case where the image capturing direction of the imaging apparatus 1 does not change and the user is not able to operate the imaging apparatus 1 following the movement of the object. In FIG. 5, suppose that a detection range of an imaging element 21 is defined as S1, a focal length of an optical system 22 is denoted by F1, a Y coordinate of a representative point for the object located at a point P moves to a point P' by ΔY while the imaging unit 2 hardly moves, and a distance between the optical system 22 and the object is denoted by D1, the change amount calculation unit 84 calculates a movement distance ΔY using a position change ΔS of an image on the imaging element 21, the distance D1, and the focal length F1, as follows:

$$\Delta Y = \Delta S \cdot D1 / F1 \qquad (2)$$

Hereinafter, the change amount will be referred to as a second change amount. The formula (2) is based on the assumption that a change in a depth direction on the screen rarely occurs when image capture is continuously performed. While the change amount in the vertical direction has been described, the change amount in the horizontal direction can also be calculated in a similar manner. Moreover, in a case where the height of the object is obtained with the height of the imaging apparatus 1 as a reference, when the optical axis direction of the imaging unit 2 has an angle with respect to the horizontal direction at the point of imaging of the representative point of the object positioned at the point P, calculation can be performed by adding the amount for this angle to ΔY in formula (2).

The change amount calculation processing performed by the change amount calculation unit 84 described herein is merely an example. Alternatively, it would be possible to perform face detection of the object and to calculate a rotation amount of the face between predetermined frames as the change amount.

The timing determination unit 85 determines whether it is timing for creating and inserting auxiliary image data at the playback of the image. Exemplary timing includes the timing immediately after stop of movement of the object on the screen and the timing immediately after the height reaches a highest point or a lowest point. More specifically, in the case of capturing a moving image of a situation in which a person gliding while riding on a snowboard illustrated in FIG. 2, the timing immediately after the height reaches the highest point may include timing of technically successful timing after jump, or the timing of stopping the movement. Moreover, in the case of capturing a moving image of a situation in which a baseball pitcher pitches a ball, the timing may include the timing of a state where the arm is extended, or the timing immediately after the fingertip reaches the highest point. Moreover, in the case of capturing a moving image of a situation in which a golfer swings, the timing may include the timing immediately after the tip end of the golf club reaches the lowest point. In this manner, regarding the timing of inserting the auxiliary image into a moving image of a sporting event, a template of the operation for insertion timing may be preliminarily stored in the storage unit 9, and the insertion timing may be determined by performing template matching by the timing determination unit 85.

Figure 6:
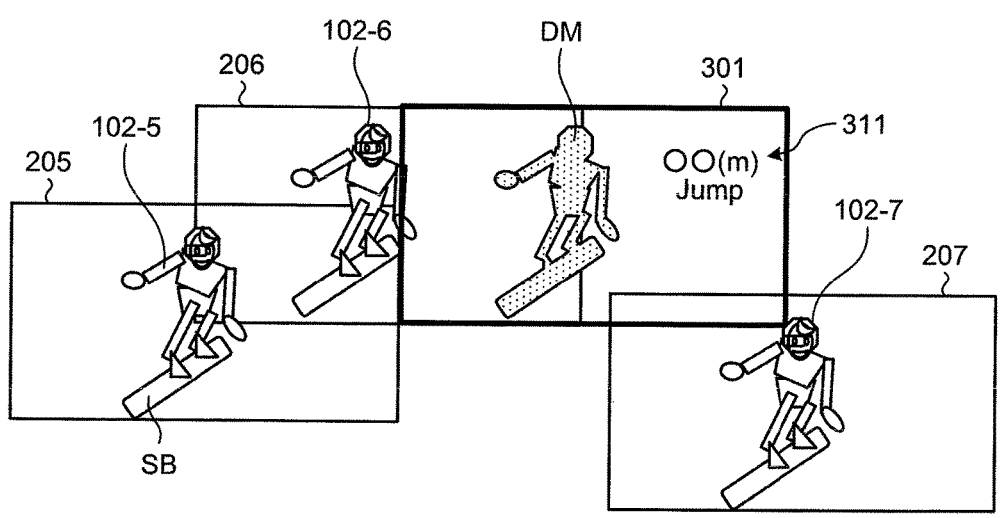
FIG. 6 is a diagram schematically illustrating an auxiliary image and its preceding and succeeding images overlapping with each other, displayed by the display unit.

The auxiliary image creation unit 86 creates data of an auxiliary image. FIG. 6 is a diagram schematically illustrating an auxiliary image and its preceding and succeeding images overlapping with each other, displayed by the display unit 6. FIG. 6 illustrates an auxiliary image 301, images 205 and 206 sequentially displayed before the auxiliary image 301, and an image 207 displayed after the auxiliary image 301. The positions of the images correspond to image capturing directions (heights). FIG. 6 illustrates the auxiliary image in a case where the user operates the imaging apparatus 1 following the movement of the object, in which positions of the snowboarder 102-$n$ in the images 20$n$ ($n$=5, 6, and 7) are substantially the central portions of the screen in all cases. The auxiliary image 301 displays height information 311 (display of ○○ (m)) for the highest point, a dummy image DM indicating the object in an immediately preceding frame, schematically illustrated by halftone dots, and texts of "Jump" indicating that the object is jumping. The auxiliary image 301 may further include display of speed information on the object. In the case illustrated in FIG. 6, the auxiliary image 301 is inserted at the timing immediately after an image 206 corresponding to the state where the object reaches the highest point. The auxiliary image 301 is displayed for a time recognizable by a viewer of the image (for example, about two to three seconds). Note that although FIG. 6 illustrates the outer frame of the auxiliary image 301 in thick lines in order to make it identifiable, this illustration is used merely for convenience to clarify the description. Moreover, the dummy image need not be the one using the image of immediately preceding frame.

Instead of using the dummy image DM, the auxiliary image creation unit 86 may create auxiliary image data by simply superposing the image of the object in the image 206 in the preceding frame, or by superposing image data obtained by applying special effect processing on the image of the object in the preceding frame. Herein, the special effect processing is processing of generating visual effects by combining a plurality of types of image processing. Examples of the plurality of types of image processing include soft focus processing, shading processing, combining processing, HDR processing, and saturation enhancement processing.

The history image creation unit 87 creates data of a history image that changes with time if reciprocating movement is deemed to occur, for example, if a person gliding on the snowboard halfpipe is defined as the object. The history image creation unit 87 may obtain positional information regarding the horizontal direction by performing integration twice using results of detection by the accelerometer in the horizontal direction. The history image creation unit 87 may convert a change in movement of the object in the horizontal direction on the image, into the speed, and may obtain positional information for each point in time using the speed. The history shown on the history image created by the history image creation unit 87 is not limited to the reciprocating motion. It is possible to create a history that draws a specific orbit. For example, the history image creation unit 87 can also create a history image that displays rotation history along a substantially circular orbit, such as an orbit drawn when a golfer hits a ball.

Figure 7:
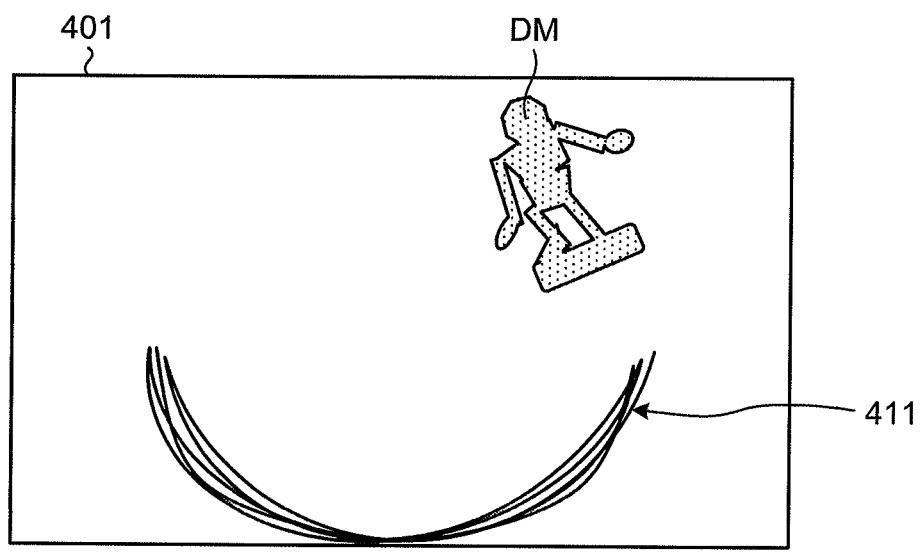
FIG. 7 is a diagram illustrating a display example of a history image on the display unit.

FIG. 7 is a diagram illustrating a display example on the display unit 6 of a history image. A history image 401 in the diagram represents a history 411 in a case where a snowboarder gliding on a snowboard halfpipe is the object. On the history image 401, the dummy image DM is also displayed. Note that the dummy image DM need not be always displayed. Although the history image is displayed after playback of the moving image in the embodiment, the history image may be displayed immediately before playback of the moving image, or the history image may be inserted and displayed at appropriate timing during playback of the moving image.

The display controller 88 controls display of images, or the like on the display unit 6. The display controller 88 appropriately inserts and displays auxiliary images and history images. The display controller 88 may control such that, for example, at insertion and display of an auxiliary image, a playback image is displayed at a frame rate gradually decreasing before display of the auxiliary image and that the playback image is displayed at a frame rate gradually increasing after insertion of the auxiliary image.

The control unit 8 having the above-described functional configuration has a general-purpose processor such as a central processing unit (CPU).

The storage unit 9 includes an image data storage unit 91 and a program storage unit 92. The image data storage unit 91 stores data of various images. The program storage unit 92 stores various programs including an imaging program for executing an imaging method according to the embodiment.

The storage unit 9 includes volatile memory such as random access memory (RAM), and non-volatile memory such as a read only memory (ROM). Among these, the RAM has a function of a temporary storage unit that stores processed image data input from the image processing unit 81 and information being processing by the imaging apparatus 1. Note that the storage unit 9 may include a computer-readable recording medium such as a memory card that can be attached from outside.

Figure 8:
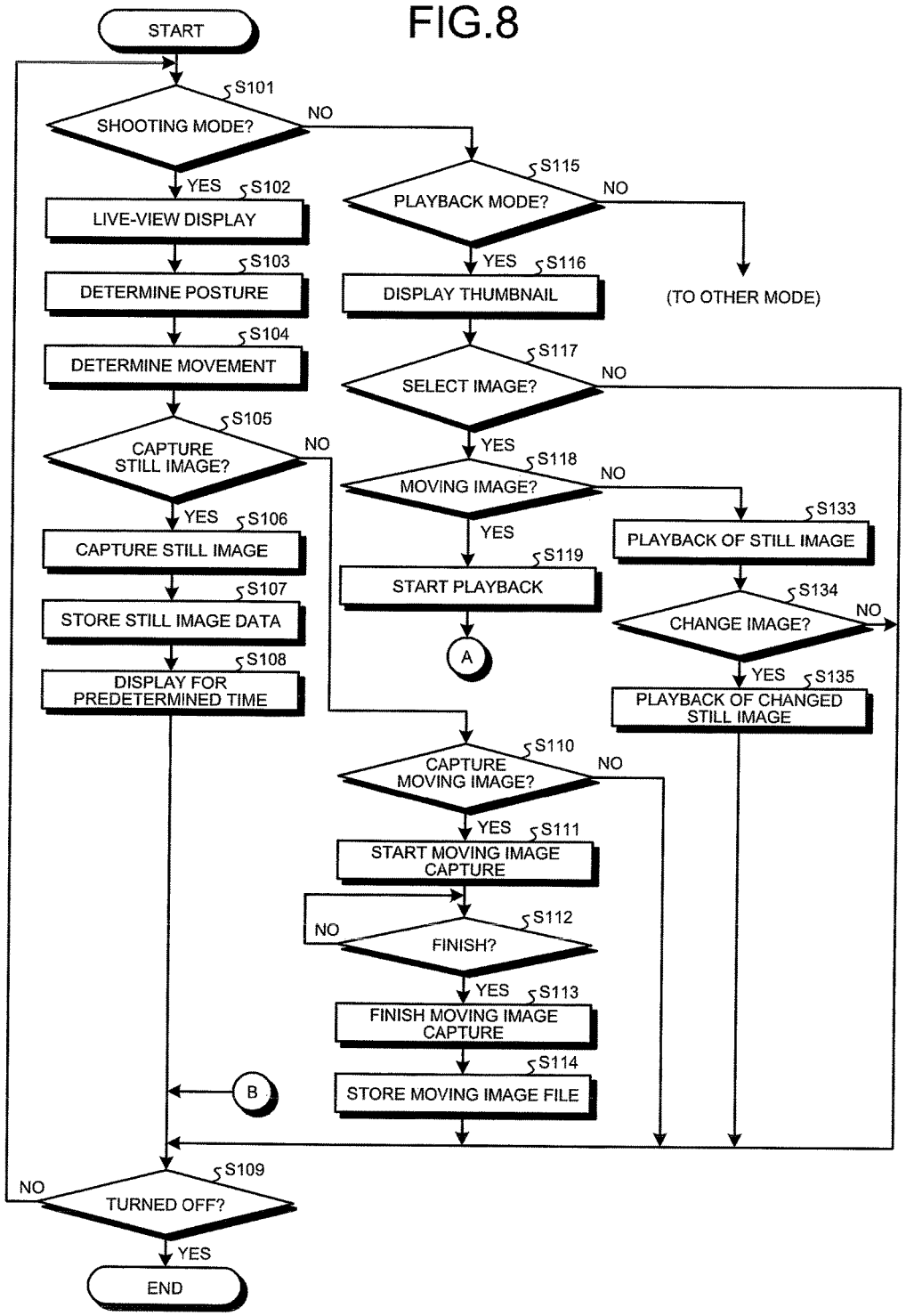
FIG. 8 is a flowchart (1) illustrating an outline of processing performed by the imaging apparatus.
Figure 9:
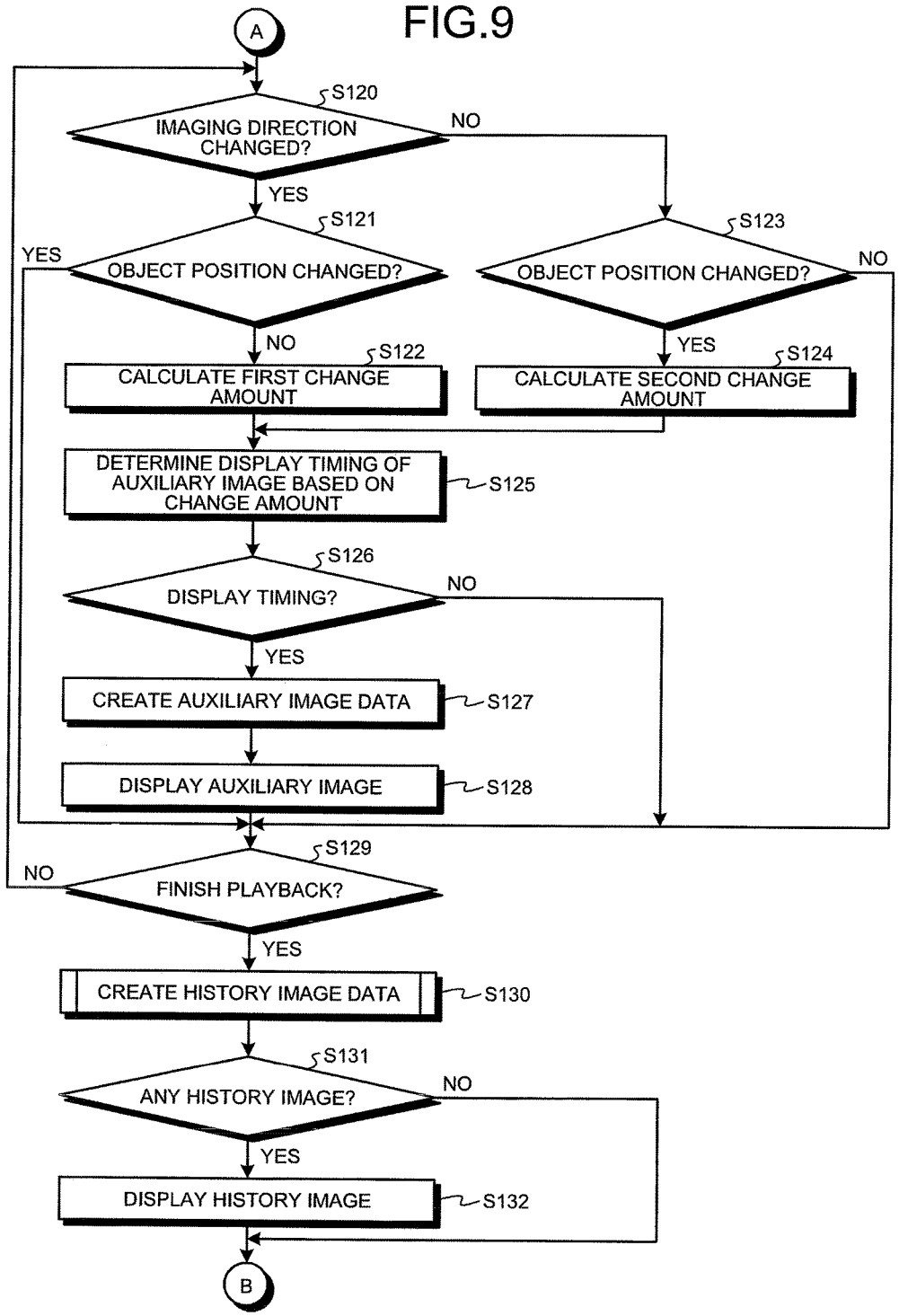
FIG. 9 is a flowchart (2) illustrating an outline of processing performed by the imaging apparatus.

FIGS. 8 and 9 are flowcharts illustrating an outline of processing performed by the imaging apparatus 1. First, description will follow with reference to FIG. 8. In a case where the imaging apparatus 1 is set to a shooting mode (step S101: Yes), the display controller 88 displays, on the display unit 6, a live-view image corresponding to the live-view image data continuously generated by the imaging unit 2 (step S102).

Subsequently, the posture/movement determination unit 82 determines posture of the imaging apparatus 1 based on a result of detection by the posture detecting unit 5 and records the determination result on the storage unit 9 (step S103). the posture/movement determination unit 82 determines movement of the object using the image data generated by the imaging unit 2 and writes and stores the determination result into the storage unit 9 (step S104). The posture/movement determination unit 82 may make a posture/movement determination at another timing.

Thereafter, when a release switch on the input unit 4 has received input indicating still image capture (step S105: Yes), the control unit 8 causes the imaging unit 2 to execute the still image capture (step S106). In this case, the image processing unit 81 performs predetermined image processing on the image data (RAW data) generated by the imaging unit 2.

Thereafter, the image processing unit 81 writes and stores the image data of the still image into the image data storage unit 91 (step S107). At this time, the image processing unit 81 performs resize processing on the image data generated by the imaging unit 2 so as to create a thumbnail of the still image, and stores the thumbnail in association with the processed image data corresponding to the thumbnail, into the image data storage unit 91.

Subsequently, the display controller 88 displays (step S108) a still image that corresponds to the image data of the still image generated by the imaging unit 2, on the display unit 6 for a predetermined period (e.g. three seconds).

Thereafter, when the imaging apparatus 1 is turned off via the input unit 4 (step S109: Yes), the imaging apparatus 1 finishes a series of processing. In contrast, if the imaging apparatus 1 is not turned off via the input unit 4 (step S109: No), the imaging apparatus 1 returns to step S101.

If, in step S105, the release switch on the input unit 4 has not received input indicating the still image capture (step S105: No), the imaging apparatus 1 proceeds to step S110.

Subsequently, when a moving image switch of the input unit 4 has received input of a starting command signal for moving image capture (step S110: Yes), the control unit 8 controls start of the moving image capture (step S111). Specifically, the control unit 8 causes the imaging unit 2 to execute the moving image capture according to a predetermined moving image format, and the image processing unit 81 performs image processing on the image data continuously generated by the imaging unit 2, and starts generation of a moving image file by adding sound data generated by the sound input unit 3. Regarding the frame rate in the moving image capture, the user can select and set a desired frame rate by operating the input unit 4.

Thereafter, when the moving image switch has received input of a finishing command signal for the moving image capture (step S112: Yes), the control unit 8 controls of finishing the moving image capture (step S113). If input of the finishing command signal for the moving image capture has not been received (step S112: No), the imaging apparatus 1 repeats step S112.

Subsequently, the image processing unit 81 writes and stores image data of the moving image into the image data storage unit 91 (step S114). At this time, the image processing unit 81 creates a thumbnail for a moving image using image data of the first frame constituting the moving image data, and writes and stores the thumbnail in association with a moving image file that corresponds to the thumbnail, into the image data storage unit 91. Thereafter, the imaging apparatus 1 proceeds to step S109.

If there is no operation of imaging a moving image in step S110 (step S110: No), the imaging apparatus 1 proceeds to step S109.

Next, description will follow regarding a case where the imaging apparatus 1 is not set to the shooting mode (step S101: No) and the imaging apparatus 1 is set to the playback mode (step S115: Yes). In this case, the display controller 88 performs thumbnail display, in which thumbnails for the still image or the moving image stored in the image data storage unit 91 are sequentially displayed on the display unit 6 (step S116).

Subsequently in a case where the input unit 4 has received selective input of any one of a plurality of thumbnails displayed by the display unit 6 (step S117: Yes), and when the selected image is a moving image (step S118: Yes), the display controller 88 starts playback of the selected moving image, on the display unit 6 (step S119). Note that in a case where the input unit 4 has not received selective input of any one of the plurality of thumbnails displayed by the display unit 6 (step S117: No), the imaging apparatus 1 proceeds to step S109.

Processing following step S119 will be described with reference to FIG. 9. In step S120, the change determination unit 83 determines whether the image capturing direction of the imaging unit 2 has changed (step S120). When the image capturing direction has changed (step S120: Yes) and the position of the object within the screen has not changed (step S121: No), the change amount calculation unit 84 calculates the first change amount based on formula (1) (step S122). This situation corresponds to the situation in which the user is operating the imaging apparatus 1 following the movement of the object, as illustrated in FIG. 4. Thereafter, the imaging apparatus 1 proceeds to step S125. When the position of the object within the screen has changed in step S121 (step S121: Yes), the imaging apparatus 1 proceeds to step S129 to be described below.

In contrast, if, in step S120, the image capturing direction has not changed (step S120: No) and when the position of the object within the screen has changed (step S123: Yes), the change amount calculation unit 84 calculates the second change amount based on formula (2) (step S124). This situation corresponds to the situation in which the user is operating the imaging apparatus 1 without being able to follow the movement of the object, as illustrated in FIG. 5. After step S124, the imaging apparatus 1 proceeds to step S125. When the position of the object within the screen has not changed in step S123 (step S123: No), the imaging apparatus 1 proceeds to step S129 to be described below.

In step S125 performed after one of step S122 and S124, the timing determination unit 85 determines timing for inserting and displaying an auxiliary image based on the first change amount calculated in step S122 or based on the second change amount calculated in step S124 (step S125).

If the timing determination unit 85 determines that it is timing for displaying the auxiliary image (step S126: Yes), the auxiliary image creation unit 86 creates data of the auxiliary image using information on the image displayed at that timing (step S127). Herein, the information on the image is information related to at least any of height, speed, and orientation, of the object. The timing determination unit 85 may determine timing for displaying the auxiliary image immediately after the moving image capturing, and the auxiliary image creation unit 86 may create data of the auxiliary image based on the result of determination. Alternatively, the information on the image may be a result of estimation using actual measurement values such as the height, speed, and orientation, of the object. If the timing determination unit 85 has determined in step S126 that it is not the timing for displaying the auxiliary image (step S126: No), the imaging apparatus 1 proceeds to step S129. The timing, of course, may be any of during playback display, before and after playback display. Displaying the auxiliary image before playback would give expectation and could obtain attention of audience and viewers. In another case where the auxiliary image is displayed after playback, it can give enjoyment for the ending or prediction, making it effective regarding ending and linking.

Thereafter, the display controller 88 displays the auxiliary image on the display unit 6 (step S128). The auxiliary image 301 illustrated in FIG. 6 is an exemplary display of the auxiliary image, on the display unit 6.

Thereafter, when the input unit 4 has received input indicating finish of the playback (step S129: Yes), the history image creation unit 87 creates data of the history image (step S130). If the input unit 4 has not received input indicating finish of the playback (step S129: No), the imaging apparatus 1 returns to step S121. The history image creation unit 87 may create data of the history image at a point in time when the moving image data is generated, and then store the data in the image data storage unit 91, regardless of indication of finish of playback.

Figure 10:
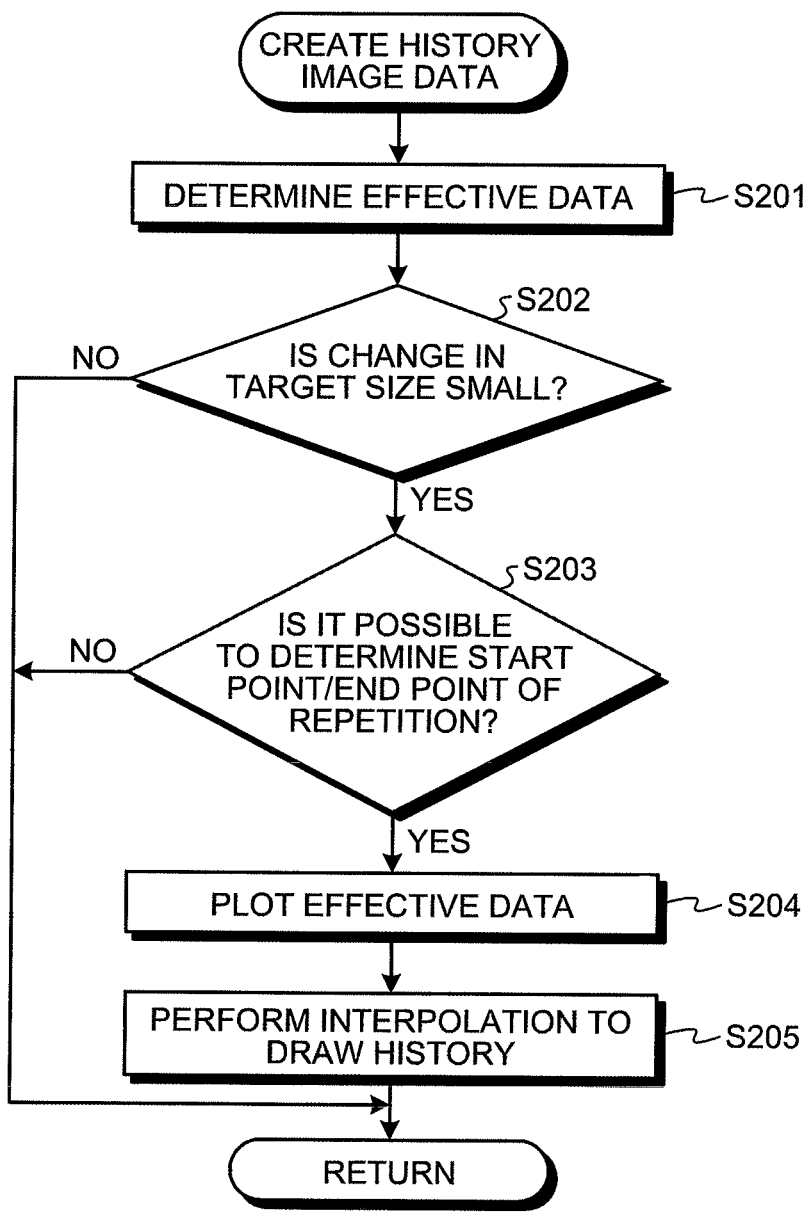
FIG. 10 is a flowchart illustrating an outline of data creation processing on the history image, performed by a history image creation unit.

FIG. 10 is a flowchart illustrating an outline of data creation processing (step S130) of the history image, performed by the history image creation unit 87. First, the history image creation unit 87 performs effective data determination (step S201). Herein, the effective data represent data that are effective in displaying the history related to the movement of the object, and correspond to the representative point of the object, that can be tracked across a plurality of frames, for example.

Subsequently, the history image creation unit 87 determines the change in the object size (step S202). In a case where it is determined that the change in the object size is small (step S202: Yes), the history image creation unit 87 proceeds to step S203. In contrast, in a case where it is determined that the change in the object size is great (step S202: No), the history image creation unit 87 finishes the history image creation processing. Herein, the change amount in the object size is determined, for example, by whether the change amount of the distance between the plurality of representative points, between the frames, exceeds a threshold.

In step S203, the history image creation unit 87 determines a start point and an end point of a repetitive operation of the object (step S203). If it is possible to determine a start point and an end point of repetitive operation of the object (step S203: Yes), the history image creation unit 87 proceeds to step S204. In contrast, if it is not possible to determine a start point and an end point of repetitive operation of the object (step S203: No), the history image creation unit 87 finishes the history image creation processing.

In step S204, the history image creation unit 87 plots effective data (step S204). Thereafter, the history image creation unit 87 performs an interpolation on the plotted effective data to draw the history of the object (step S205). With this processing, history image data are completed and the history image creation unit 87 finishes the series of processing. The history image 401 illustrated in FIG. 7 is an exemplary display of the history image displayed in this step S205. A viewer of a history image like this can estimate temporal transition of the object and estimate amounts including speed and height corresponding to the movement. It is possible not only to display all the histories at a time as illustrated in FIG. 7 but also to gradually display the histories with time. Prediction may be made on movement (temporal transition) of the object in the future based on the history image, and the result of prediction may be displayed.

Returning to FIG. 9, processing performed by the imaging apparatus 1 after step S130 will be described. In a case where there are history image data (step S131: Yes), the display controller 88 displays the history image on the display unit 6 (step S132). Thereafter, the imaging apparatus 1 proceeds to step S109 (refer to FIG. 8). In contrast, if, in step S131, there are no history image data (step S131: No), the imaging apparatus 1 proceeds to step S109.

Returning to FIG. 8, in step S118, if the still image thumbnail has been selected (step S118: No), the display controller 88 displays the selected still image on the display unit 6 (step S133).

Subsequently, if the input unit 4 has received input indicating a change in playback image (step S134: Yes), the display controller 88 performs playback of the image that has been changed according to the indication, on the display unit 6 (step S135). Specifically, when the input unit 4 receives input indicating the image change, the display controller 88 first displays selectable images in thumbnails on the display unit 6 to prompt the user to select and input the image to be changed. Thereafter, when the input unit 4 receives selective input of the thumbnail on the screen displaying thumbnails, the display controller 88 causes the display unit 6 to enlarge a still image corresponding to the selected thumbnail and to perform playback display of the still image. Thereafter, the imaging apparatus 1 proceeds to step S109.

In step S134, if the input unit 4 has not received input indicating the change in playback image (step S134: No), the display controller 88 proceeds to step S109.

Lastly, a case where, in step S115, the imaging apparatus 1 is not set to the playback mode (step S115: No) will be described. In this case, the imaging apparatus 1 proceeds to a mode that enables other setting. Description on the mode that enables other setting will be omitted.

According to one embodiment of the present invention, using data of a plurality of images captured continuously, it is determined whether a change in direction of capturing the plurality of images occurs, the change amount of the position of the object shown in the plurality of images is calculated depending on whether the change in the image capturing direction occurs, and the data of the auxiliary image that displays information on the object, related to the change amount, are created. With this configuration, a viewer of the playback image can intuitively grasp the characteristics of the object through the auxiliary image.

Furthermore, according to the embodiment, it is possible to achieve playback of diversified moving images by inserting the auxiliary image during playback of the moving image.

Furthermore, according to the embodiment, the history image of the object is displayed with the playback image, making it possible for the viewer of the playback image to intuitively grasp the history characteristic to the object.

The above-described imaging apparatus 1 may be configured with a lens-system camera having imaging functions, including the imaging unit 2, and a mobile device, such as a smartphone, capable of communicating with this camera. In this case, functions of the image processing apparatus according to the embodiment may be implemented either on the camera side or on the mobile device side.

When a measurement function and an estimation function related to the movement of the object are provided on the imaging apparatus 1, the apparatus can also be applied as a monitor camera and an on-vehicle camera. In this case, it is possible to increase the amount of and enhance the accuracy of various types of information for measuring or estimating the movement and the position change of the object, while including positional information, elevation angle information, and orientation information, or the like, obtained from a global positioning system (GPS) corresponding to the position to fix the imaging apparatus 1 and its movable range. By enabling acquisition of high-accuracy information by increasing the amount of various types of information, it is possible to create a variety of auxiliary images containing a large amount of information.

Moreover, the above-described imaging apparatus 1 may be used as a general apparatus including an imaging function, such as medical or industrial endoscopes. In this case, the functions of the image processing apparatus according to the embodiment may be provided on the processor side.

Furthermore, the imaging apparatus 1 may also be applied to microscopes and measurement observation devices. In this case, the auxiliary image may assist the user's visibility. Visualization of the movement of the object as well as the movement of the apparatus itself may assist the user's operation.

The flowcharts herein clarify the sequence of processing in each of steps by using expressions of "first", "thereafter", "subsequently", or the like. However, the order of processing necessary for achieving the above-described embodiments is not intended to be uniquely defined to this order by these expressions. In other words, the order of processing in the flowcharts described herein can be changed within a range implementable without contradiction.

Furthermore, the algorithm of the processing described with reference to the flowchart herein, can be described as a program. Such a program may be recorded in the storage unit inside the computer or may be recorded on a computer-readable recording medium. Recording to the storage unit or recording medium of the program may be performed at shipment of the computer or the recording medium as a product, or may be performed by downloading via a communication network.

According to some embodiments, an auxiliary image for displaying information on the object is inserted between images being played back, and the auxiliary image is displayed. Accordingly, it is possible for a user to intuitively grasp characteristics of the object during playback of the images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for tracking motion of an object relative to a moving reference frame, the apparatus comprising:
   an imager that acquires a plurality of images of the object continuously;
   a sensor that measures a posture of the imager;
   a processor that is communicatively coupled to the imager and the sensor, wherein the processor:
   receives the plurality of images of the object from the imager,
   determines, using the plurality of images, a change in direction of the object,
   detects a changing direction of the imager based on the posture measured by the sensor,
   calculates a change amount of a position of the object based on the detected changing direction of the imager; and
   creates data of an auxiliary image for displaying information on the object based on the calculated change amount, wherein the auxiliary image contains height information on a representative point of the object at a point in time when the changing direction of the imager stops.

2. The image processing apparatus according to claim 1, wherein the processor further:
   inserts the auxiliary image at timing adjacent to one of the plurality of images when playing back the plurality of images on a display unit.

3. The image processing apparatus according to claim 2, wherein the processor further:
   determines the timing of inserting the auxiliary image during playback of the plurality of images, and
   displays the auxiliary image on the display unit based on the determined timing.

4. The image processing apparatus according to claim 2, wherein the processor further:
   creates data of a history image indicating a temporal history of the representative point on the plurality of images, and
   displays the history image on the display unit at predetermined timing.

5. The image processing apparatus according to claim 4, wherein
the history image shows a history of reciprocating motion of the object.

6. The image processing apparatus according to claim 1, wherein the processor further:
determines whether a position of the object within a screen has changed between different images of the plurality of images, and
calculates the change amount depending on whether the change in direction of capturing the plurality of images occurs and whether the position of the object within the screen has changed.

7. An image processing method for tracking motion of an object relative to a moving reference frame, the method comprising:
receiving a plurality of images of the object from an imager, wherein the imager acquires the plurality of images of the object continuously;
determining, using the plurality of images, a change in direction of the object;
detecting a changing direction of the imager based on a posture measured by a sensor;
calculating a change amount of a position of the object based on the detected changing direction of the imager; and
creating data of an auxiliary image for displaying information on the object, based on the calculated change amount, wherein the auxiliary image contains height information on a representative point of the object at a point in time when the changing direction of the imager stops.

8. A non-transitory computer-readable recording medium that stores an executable image processing program for tracking motion of an object relative to a moving reference frame, the program, when executed by a computer, causes the computer to:
receive a plurality of images of the object from an imager, wherein the imager acquires the plurality of images of the object continuously
determine, using the plurality of images captured continuously, a change in direction of the object;
detect a changing direction of the imager based on a posture measured by a sensor;
calculate a change amount of a position of the object based on the detected changing direction of the imager; and
create data of an auxiliary image for displaying on the object, based on the calculated change amount, wherein the auxiliary image contains height information on a representative point of the object at a point in time when the changing direction of the imager stops.

* * * * *